(12) United States Patent
Hwang et al.

(10) Patent No.: US 11,229,031 B2
(45) Date of Patent: Jan. 18, 2022

(54) UPLINK CONTROL INFORMATION TRANSMITTING METHOD IN WIRELESS COMMUNICATION SYSTEM AND DEVICE USING METHOD

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 50 days.

(21) Appl. No.: 16/768,478

(22) PCT Filed: Dec. 17, 2018

(86) PCT No.: PCT/KR2018/015996
§ 371 (c)(1),
(2) Date: May 29, 2020

(87) PCT Pub. No.: WO2019/117688
PCT Pub. Date: Jun. 20, 2019

(65) Prior Publication Data
US 2021/0176757 A1    Jun. 10, 2021

Related U.S. Application Data

(60) Provisional application No. 62/599,710, filed on Dec. 16, 2017.

(51) Int. Cl.
*H04W 72/04* (2009.01)
*H04L 27/26* (2006.01)
*H04L 5/00* (2006.01)

(52) U.S. Cl.
CPC ....... *H04W 72/0493* (2013.01); *H04L 5/0055* (2013.01); *H04L 27/26025* (2021.01);
(Continued)

(58) Field of Classification Search
CPC ......... H04W 72/0493; H04W 72/0413; H04W 72/042; H04W 72/0453; H04L 27/26025; H04L 5/0055; H04L 5/0053
See application file for complete search history.

(56) References Cited

U.S. PATENT DOCUMENTS 10,523,380 B2 * 12/2019 Guan .................... H04L 1/1607
2016/0277155 A1    9/2016 Nissila
(Continued)

FOREIGN PATENT DOCUMENTS

EP    3242432    11/2017

OTHER PUBLICATIONS

Intel Corporation, "Resource Allocation for PUCCH," R1-1720092, 3GPP TSG RAN WG1 Meeting 91, Reno, USA, Nov. 18, 2017, see section 3, and figure 1.
(Continued)

*Primary Examiner* — Brian T O Connor
(74) *Attorney, Agent, or Firm* — Dentons US LLP

(57) ABSTRACT

An uplink control information (UCI) transmitting method and device in a wireless communication system are provided. The method receives a first ACK/NACK resource indicator (ARI) in a first downlink bandwidth part (BWP), receives a second ARI in a second downlink BWP, determines UCI transmitted in an uplink BWP according to whether a first physical uplink control channel (PUCCH) resource indicated by the first ARI is the same as a second PUCCH resource indicated by the second ARI, and transmits the determined UCI through the uplink BWP.

16 Claims, 16 Drawing Sheets

(52) U.S. Cl.
CPC ..... *H04W 72/042* (2013.01); *H04W 72/0413* (2013.01); *H04W 72/0453* (2013.01)

(56) References Cited

U.S. PATENT DOCUMENTS

| | | | |
|---|---|---|---|
| 2017/0302412 A1* | 10/2017 | Guan | H04L 5/0053 |
| 2017/0310426 A1* | 10/2017 | Fan | H04L 1/0013 |
| 2018/0145818 A1* | 5/2018 | Choi | H04L 5/0051 |
| 2018/0279229 A1* | 9/2018 | Dinan | H04W 52/367 |
| 2019/0174440 A1* | 6/2019 | Kwak | H04L 25/00 |
| 2019/0253198 A1* | 8/2019 | Baldemair | H04W 72/14 |

OTHER PUBLICATIONS

Huawei et al., "Resource Allocation for PUCCH," R1-1717073, 3GPP TSG RAN WG1 Meeting #90bis, Prague, Czech Republic, Oct. 2, 2017, see sections 2.1, 2.3.

Nokia et al., "PUCCH Resource Allocation," R1-1720014, 3GPP TSG-RAN WG1 #91, Reno, Nevada, USA, Nov. 17, 2017, see sections 2.3-3.1.

* cited by examiner

UPLINK CONTROL INFORMATION TRANSMITTING METHOD IN WIRELESS COMMUNICATION SYSTEM AND DEVICE USING METHOD

This application is the National Stage filing under 35 U.S.C. 371 of International Application No. PCT/KR2018/015996, filed on Dec. 17, 2018, which claims the benefit of U.S. Provisional Applications No. 62/599,710 filed on Dec. 16, 2017, the contents of which are all hereby incorporated by reference herein in their entirety.

BACKGROUNDS

Field of the Disclosure

The disclosure relates to wireless communication and, more particularly, to a method for transmitting uplink control information in a wireless communication system and a device using the method.

RELATED ART

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication.

In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the disclosure for convenience.

In future wireless communication systems, such as NR, a bandwidth part (BWP) may be introduced. A bandwidth part may be used to allocate part of a band for a UE that is difficult to support a broadband in a wireless communication system using the broadband.

Conventionally, it is assumed that only one bandwidth part in one carrier is activated. For example, it is assumed that even though a plurality of bandwidth parts is configured in a downlink carrier, activation of only one of the plurality of bandwidth parts is supported. Likewise, in an uplink carrier, activation of only one bandwidth part is supported. In NR that needs to support a variety of services with various requirements, this assumption may not be valid.

SUMMARY

An aspect of the disclosure is to provide a method for transmitting uplink control information in a wireless communication system and a device using the method.

In one aspect, a method for transmitting uplink control information (UCI) is provided. The method comprises receiving a first ACK/NACK resource indicator (ARI) in a first downlink bandwidth part (BWP); receiving a second ARI in a second downlink BWP; determining UCI transmitted in an uplink BWP according to whether a first physical uplink control channel (PUCCH) resource indicated by the first ARI is the same as a second PUCCH resource indicated by the second ARI; and transmitting the determined UCI through the uplink BWP.

The first downlink BWP and the second downlink BWP may be activated BWPs.

When the first PUCCH resource and the second PUCCH resource are different, only UCI about one of the first downlink BWP and the second downlink BWP may be transmitted.

The UCI may be determined by sequentially comparing a type of UCI about the first downlink BWP with a type of UCI about the second downlink BWP, a BWP index of the first downlink BWP with a BWP index of the second downlink BWP, and a carrier index of the first downlink BWP with a carrier index of the second downlink BWP.

When the first PUCCH resource and the second PUCCH resource are the same, UCI about the first downlink BWP and UCI about the second downlink BWP may be jointly coded and transmitted together.

The first downlink BWP and the second downlink BWP may use the same numerology.

The first downlink BWP and the second downlink BWP may be BWPs configured in the same carrier.

Each of the first ARI and the second ARI may be received through downlink control information (DCI).

In another aspect, provided is a device comprising a transceiver to transmit and receive a radio signal; and a processor coupled with the transceiver to operate, wherein the processor receives a first ACK/NACK resource indicator (ARI) in a first downlink bandwidth part (BWP), receives a second ARI in a second downlink BWP, determines UCI transmitted in an uplink BWP according to whether a first physical uplink control channel (PUCCH) resource indicated by the first ARI is the same as a second PUCCH resource indicated by the second ARI, and transmits the determined UCI through the uplink BWP.

According to the disclosure, it is possible to activate a plurality of bandwidth parts within one carrier. Since the conventional art defines the operation of a UE assuming that only one bandwidth part is activated, it is inappropriate and inefficient to apply the conventional art as it is to a future wireless communication system that supports activating a plurality bandwidth parts. According to the disclosure, it is possible to increase the resource utilization efficiency of a network by utilizing a plurality of activated bandwidth parts (BWPs) within a single carrier. Further, there is provided a method for transmitting uplink control information in a future wireless communication system that supports activating a plurality of bandwidth parts.

DESCRIPTION OF EXEMPLARY EMBODIMENTS

Figure 1:
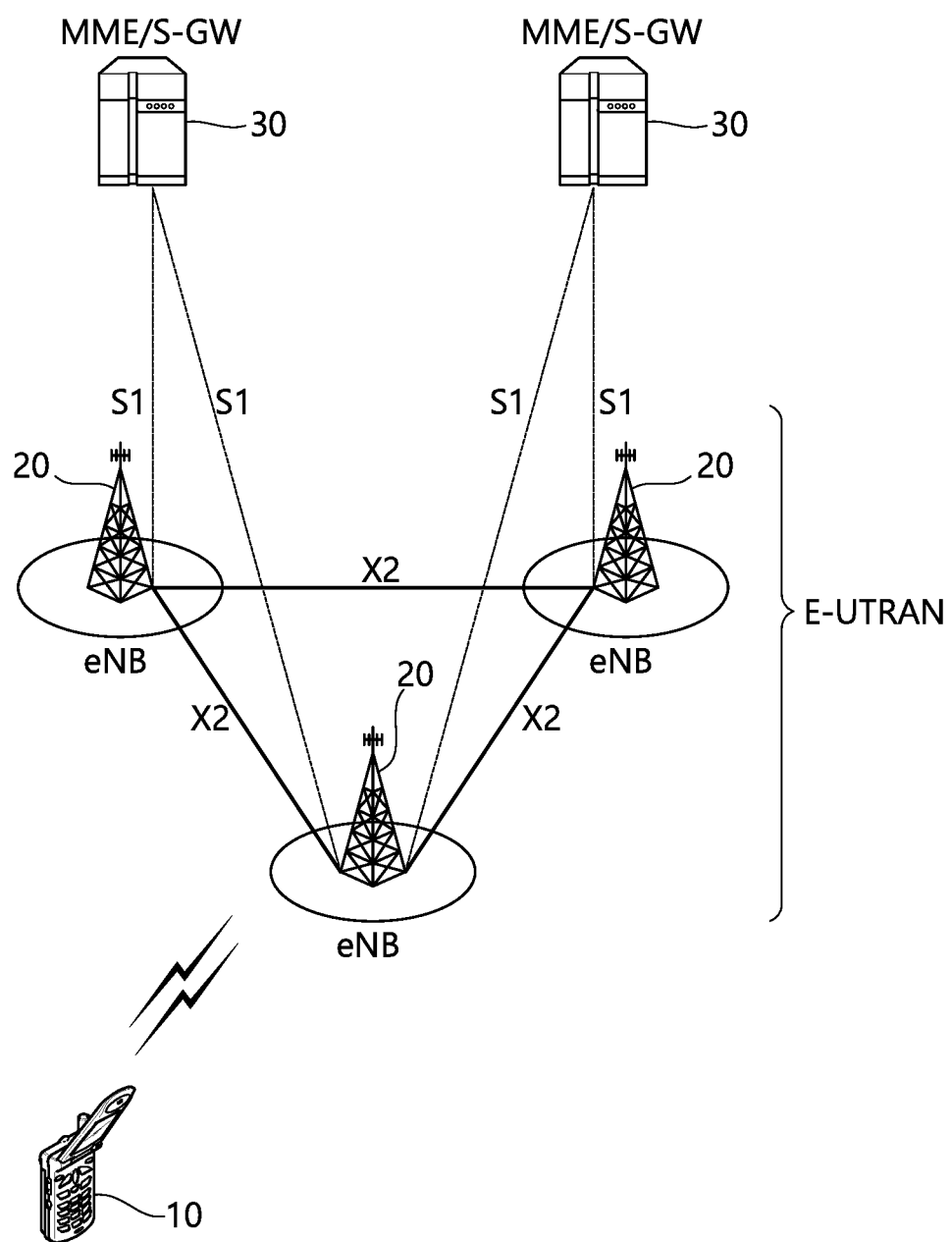
FIG. 1 illustrates an existing wireless communication system.

FIG. 1 illustrates an existing wireless communication system. This system may also be referred to as an evolved-UMTS terrestrial radio access network (E-UTRAN) or a long-term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
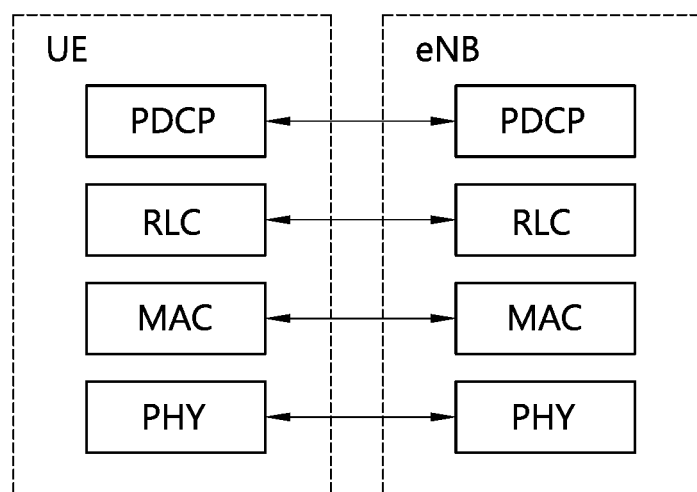
FIG. 2 is a diagram showing a wireless protocol architecture for a user plane.
Figure 3:
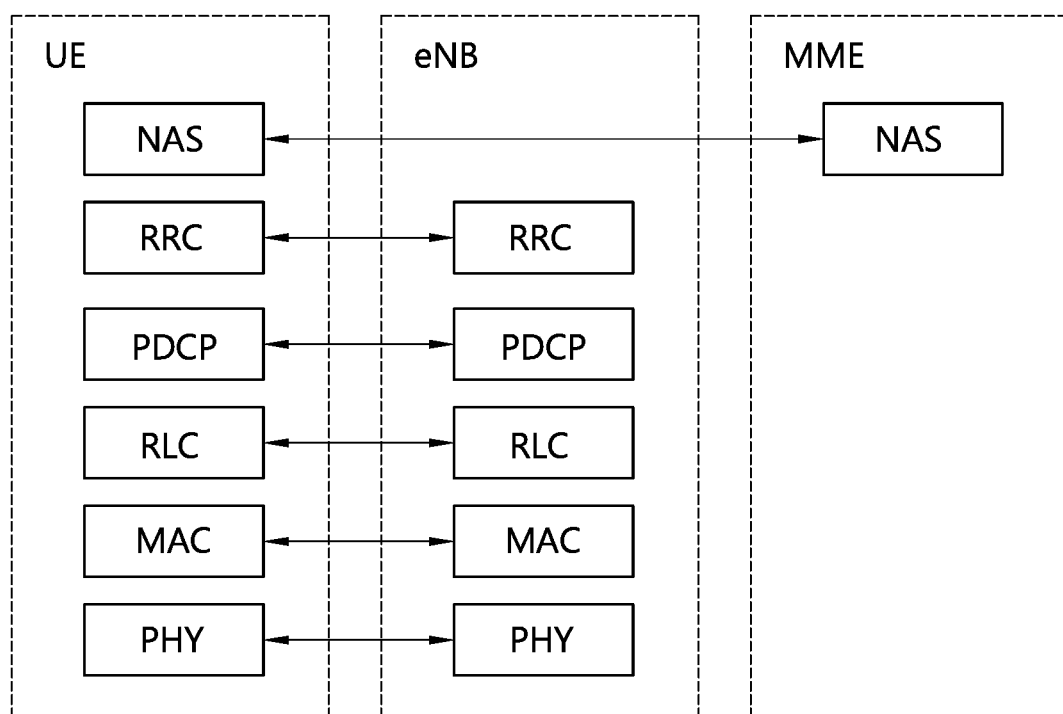
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides a higher layer with an information transfer service through a physical channel. The PHY layer is connected to a medium access control (MAC) layer which is a higher layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the disclosure for convenience.

Figure 4:
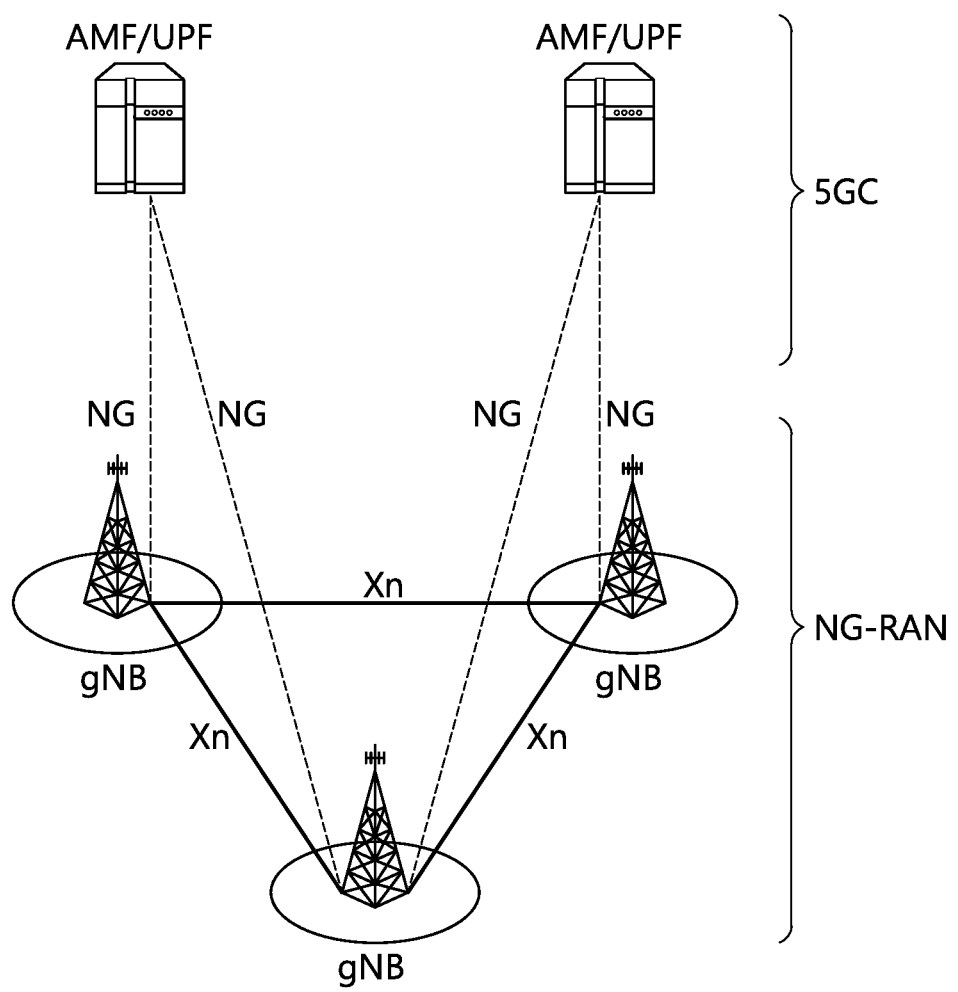
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
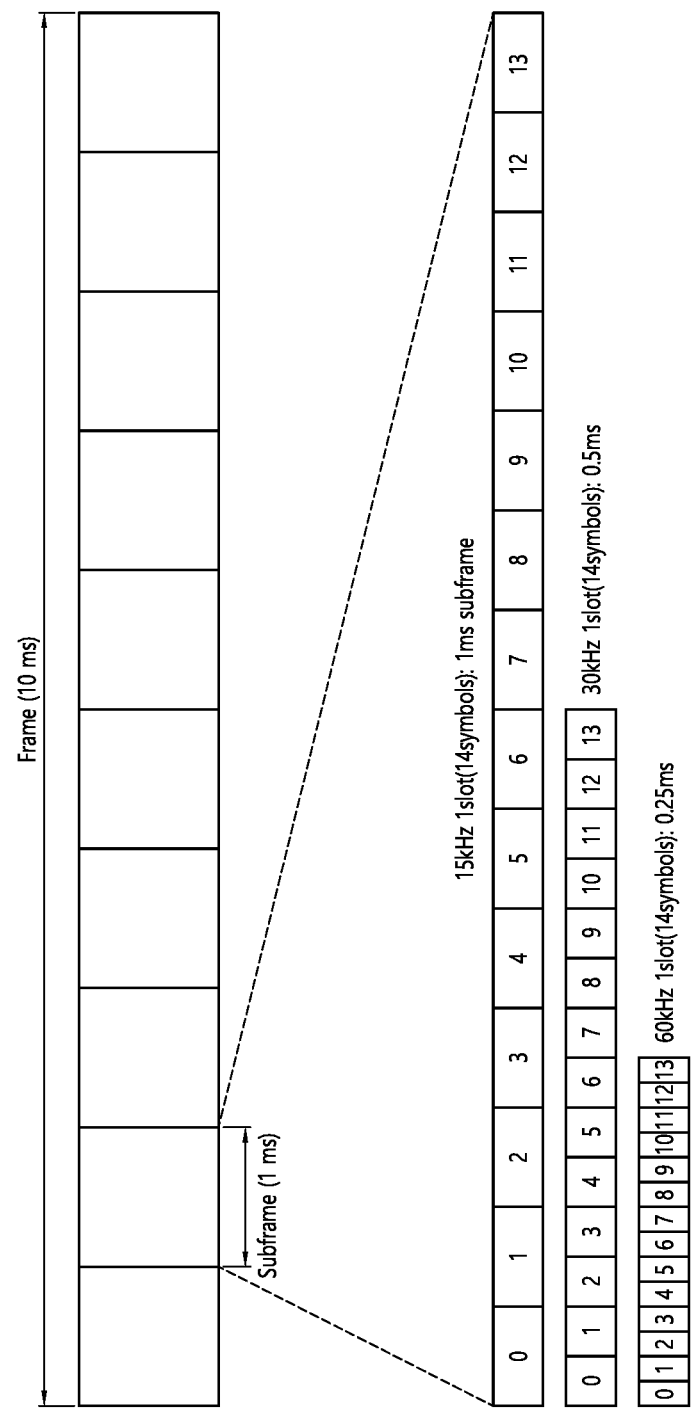
FIG. 5 illustrates an example of a frame structure that may be applied in NR.

FIG. 5 illustrates an example of a frame structure that may be applied in NR.

Referring to FIG. 5, a frame may be 10 milliseconds (ms) and may include ten 1-ms subframes. Various fields in the time domain may be represented by a time unit $T_c=1/(\Delta f_{max} N_f)$ where $\Delta f_{max}=480 \cdot 10^3$ Hz and $N_f=4096$.

In a carrier, there may be one set of frames for an uplink and one set of frames for a downlink. Transmission of an uplink frame i may be started $T_{TA}=(N_{TA}+N_{TA,offset})T_c$ earlier than the start of a corresponding downlink frame i.

One slot or a plurality of slots may be included in a subframe according to subcarrier spacing.

The following table 1 illustrates a subcarrier spacing configuration μ.

TABLE 1

| μ | Δf = $2^μ$ ·15 [kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

Table 2-1 illustrates the number of slots in a frame ($N^{frame,μ}_{slot}$), the number of slots in a subframe ($N^{subframe,μ}_{slot}$), and the number of symbols in a slot ($N^{slot}_{symb}$) according to a subcarrier spacing configuration μ in a normal CP. Table 2-2 illustrates the number of slots in a frame ($N^{frame,μ}_{slot}$), illustrates the number of slots in a subframe ($N^{subframe,μ}_{slot}$), and the number of symbols in a slot ($N^{slot}_{symb}$) according to a subcarrier spacing configuration μ in an extended CP.

TABLE 2-1

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2-2

| μ | $N^{slot}_{symb}$ | $N^{frame,μ}_{slot}$ | $N^{subframe,μ}_{slot}$ |
|---|---|---|---|
| 2 | 12 | 40 | 4 |

FIG. 5 illustrates examples where μ=0, 1, 2.

A plurality of orthogonal frequency division multiplexing (OFDM) symbols may be included in a slot. The plurality of OFDM symbols in the slot may be divided into downlink symbols (represented by D), flexible symbols (represented by X), and uplink symbols (represented by U). The format of the slot may be determined according to which of D, X, and U the OFDM symbols in the slot include.

The following table illustrates an example of a slot format.

TABLE 3

| For- | Symbol number in slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |

TABLE 3-continued

| For-mat | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | X | X | U | U | U | U | U | U | U |
| 46 | D | D | D | D | X | U | D | D | D | D | D | X | X | U |
| 47 | D | D | X | U | U | U | D | D | X | U | U | U | U | U |
| 48 | D | X | U | U | U | U | D | X | U | U | U | U | U | U |
| 49 | D | D | D | D | X | X | U | D | D | D | D | X | X | U |
| 50 | D | D | X | X | U | U | U | D | X | X | U | U | U | U |
| 51 | D | X | X | U | U | U | U | D | X | U | U | U | U | U |
| 52 | D | X | X | X | X | U | U | D | X | X | X | X | U | U |
| 53 | D | D | X | X | X | X | U | D | X | X | X | X | U | U |
| 54 | X | X | X | X | X | X | X | D | D | D | D | D | D | D |
| 55 | D | D | X | X | X | U | U | U | D | D | D | D | D | D |
| 56-255 | | | | | | Reserved | | | | | | | | |

A UE may be allocated a slot format through a higher-layer signal, through DCI, or on the basis of a combination of a higher-layer signal and DCI.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The UE may receive the PDCCH in the CORESET.

Figure 6:
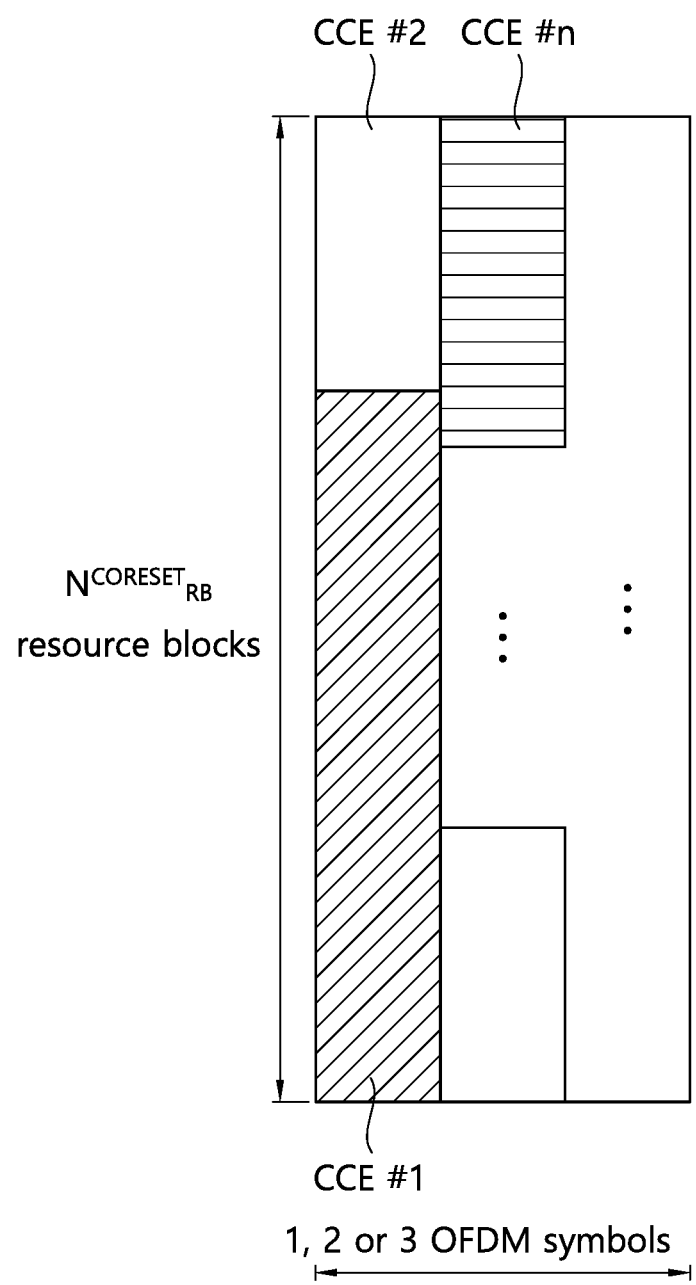
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 7:
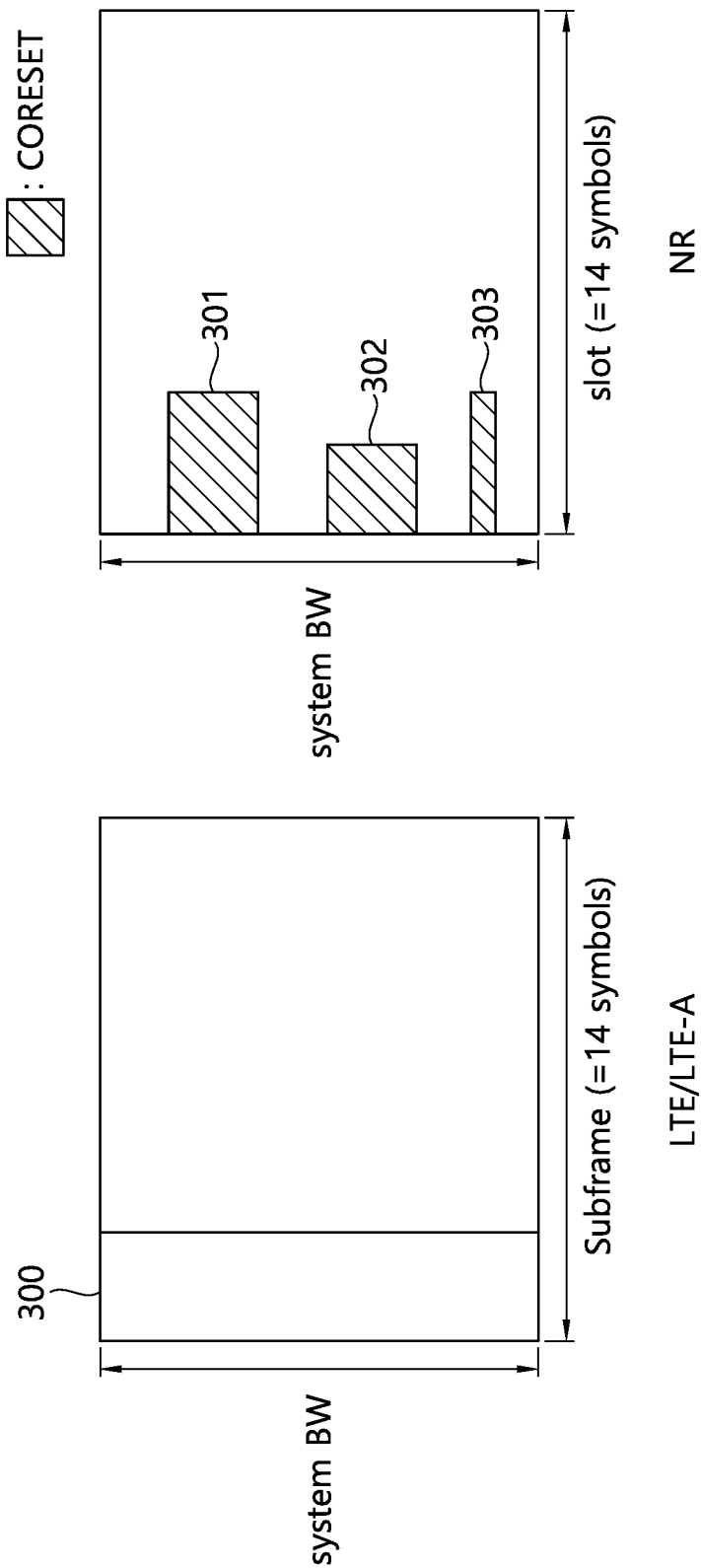
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All UEs, excluding some (e.g., eMTC/NB-IoT UE) supporting only a narrow band, need to be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the UE and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Figure 8:
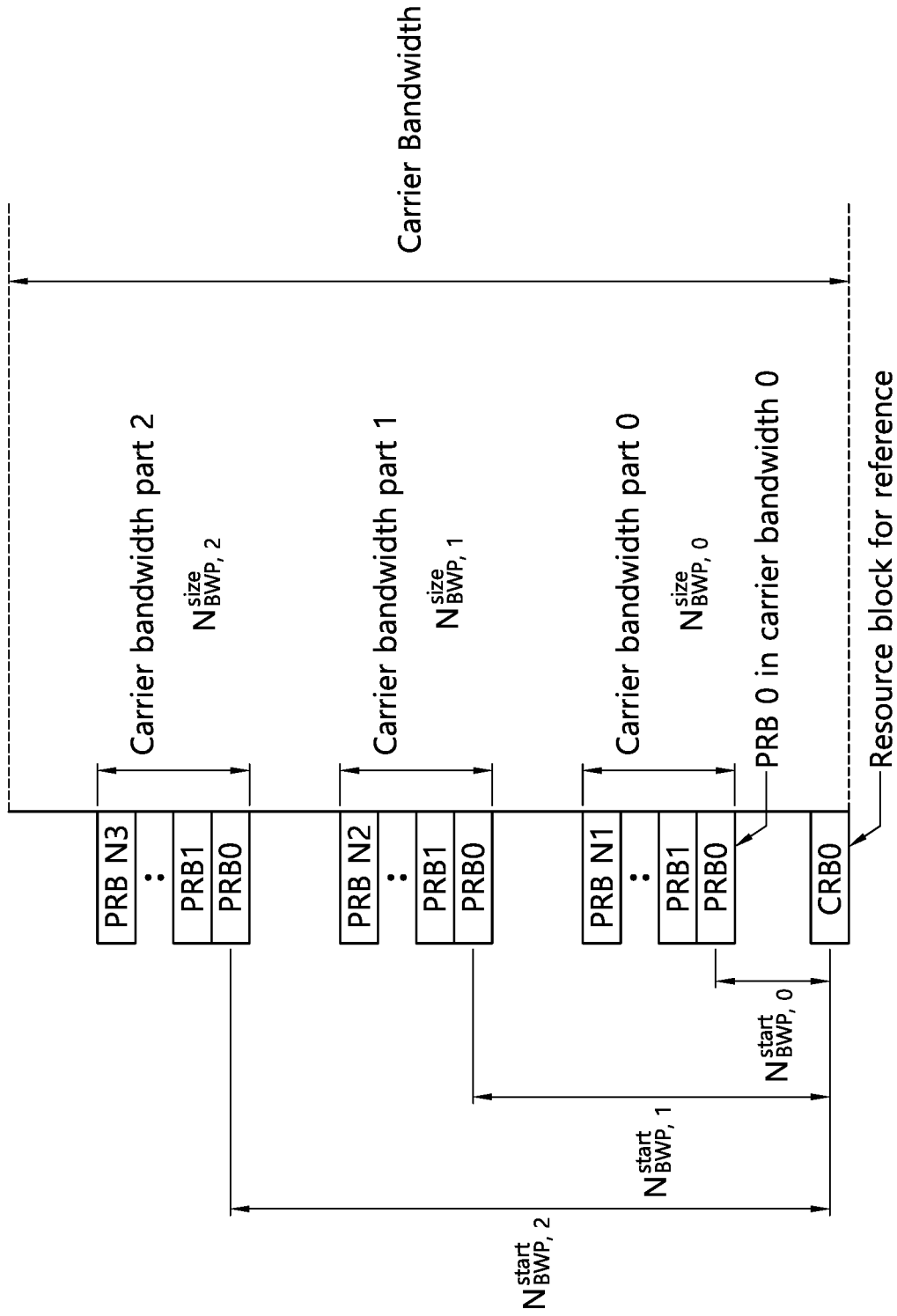
FIG. 8 illustrates a carrier bandwidth part newly introduced in NR.

FIG. 8 illustrates a carrier bandwidth part newly introduced in NR.

Referring to FIG. 8, a carrier bandwidth part may be simply referred to as a bandwidth part (BWP). As described above, in the future wireless communication system, various numerologies (e.g., various subcarrier spacings) may be supported for the same carrier. NR may define a common resource block (CRB) for a given numerology on a given carrier.

A bandwidth part is a set of contiguous physical resource blocks (PRBs) selected from contiguous subsets of common resource blocks (CRBs) for a given numerology on a given carrier.

As illustrated in FIG. 8, a common resource block may be determined according to numerology for a carrier bandwidth, for example, subcarrier spacing to be used. The common resource block may be indexed from the lowest frequency of the carrier bandwidth (start from zero), and a resource grid based on the common resource block (referred to as a common resource block resource grid) may be defined.

A bandwidth part may be indicated on the basis of a CRB having the lowest index (referred to as CRB 0). CRB 0 having the lowest index is also referred to as point A.

For example, according to given numerology of an allocated carrier, bandwidth part i may be indicated by $N^{start}_{BWP,i}$ and $N^{size}_{BWP,i}$. $N^{start}_{BWP,i}$ may indicate a starting CRB of bandwidth part i on the basis of CRB 0, and $N^{size}_{BWP,i}$ may indicate the size of bandwidth part i (e.g., in PRBs) in the frequency domain. PRBs in each bandwidth part may be indexed from 0. The index of a CRB in each bandwidth part may be mapped to the index of a PRB. For example, $n_{CRB}=n_{PRB} \pm N^{START}_{BWP,i}$.

The UE may be allocated up to four downlink bandwidth parts in a downlink, but only one downlink bandwidth part may be activated at a given time. The UE does not expect to receive a PDSCH, a PDCCH, a CSI-RS, or the like via a downlink bandwidth part other than the activated downlink bandwidth part among the downlink bandwidth parts. Each downlink bandwidth part may include at least one CORE-SET.

The UE may be allocated up to four uplink bandwidth parts in an uplink, but only one uplink bandwidth part may be activated at a given time. The UE does not transmit a PUSCH, a PUCCH, or the like via an uplink bandwidth part other than the activated uplink bandwidth part among the uplink bandwidth parts.

NR operates in a wider band than in a conventional system, where not all UEs can support a wideband. A bandwidth part (BWP) enables a UE incapable of supporting a wideband to operate.

Hereinafter, a resource allocation type will be described. A resource allocation type specifies a method for a scheduler (e.g., a BS) to allocate resource blocks for each transmission. For example, when a BS allocates a bandwidth including a plurality of resource blocks to a UE, the BS may report the resource blocks allocated to the UE through a bitmap including bits corresponding to the respective resource blocks of the band. In this case, the flexibility of resource allocation is increased, while the amount of information used for resource allocation is also increased.

In view of this advantage and disadvantage, the following three resource allocation types may be defined/used.

1) Resource allocation type 0 is a method of allocating a resource through a bitmap, each bit of which indicates a resource block group (RBG) rather than a resource block. That is, in resource allocation type 0, resource allocation is performed in resource block groups, not in resource blocks. The following table illustrates the size of a RBG used when a system bandwidth includes $N^{DL}_{RB}$ resource blocks.

TABLE 5

| System bandwidth ($N_{RB}^{DL}$) | RBG size (P) |
|---|---|
| ≤10 | 1 |
| 11-24 | 2 |
| 25-63 | 6 |
| 64-110 | 12 |

2) Resource allocation type 1 is a method of allocating a resource in RBG subsets. One RBG subset may include a plurality of RBGs. For example, RBG subset #0 may include RBGs #0, #3, #6, #9, and the like; RBG subset #1 may include RBGs #1, #4, #7, #10, and the like; RBG subset #2 may include RBGs #2, #5, #8, #11, and the like. The number of RBGs included in one RBG subset and the number of resource blocks (RBs) included in one RBG are set to be the same. Resource allocation type 1 indicates which RBG subset is used among RBG subsets and which RB in the RBG is used.

3) Resource allocation type 2 is a method of allocating a resource by indicating the starting position (RB number) of an allocated bandwidth and the number of contiguous resource blocks. The contiguous resource blocks may start from the starting position. Here, the contiguous resource blocks are not necessarily limited to physical contiguity but may mean that logical or virtual resource block indexes are contiguous.

In future wireless communication systems, the number of resource blocks included in an RBG (or a group of RBs) may be c flexibly hanged. In this case, information about the RBG, for example, information indicating the number of resource blocks included in the RBG, may be transmitted through a higher-layer signal, such as scheduling DCI, third physical layer (L1) signaling, or an RRC message.

Further, in future wireless communication systems, resource allocation information (e.g., the information about the RBG) may include time-domain information in addition to frequency-domain information. The type of included information and a method for including information may also be flexibly changed.

Hereinafter, the disclosure will be described.

According to NR, in broadband operations for a downlink and an uplink, a band larger than 20 MHz may be supported for a plurality of serving cells.

In an NR uplink, it may be supported that a band larger than 20 MHz is configured in a serving cell. In an NR downlink operation, the following BWP-based operations may be considered in a carrier having a band larger than 20 MHz.

Option 1a: A plurality of BWPs may be configured, and a plurality of BWPs may be activated. A PDSCH may be transmitted through one or a plurality of BWPs.

Option 1b: A plurality of BWPs may be configured, and a plurality of BWPs may be activated. A PDSCH may be transmitted through one BWP.

Option 2: A plurality of BWPs may be configured, and one BWP may be activated. When a clear channel assessment (CCA) for one entire BWP is successful, a gNB may transmit a PDSCH through the one BWP.

Option 3: A plurality of BWPs may be configured, and one BWP may be activated. When a clear channel assessment (CCA) is successful, a gNB may transmit a PDSCH through one entire BWP or part of the BWP.

In an uplink operation, the following BWP-based operations may be considered in a carrier having a band larger than 20 MHz.

Option 1a: A plurality of BWPs may be configured, and a plurality of BWPs may be activated. A PDSCH may be transmitted through one or a plurality of BWPs.

Option 1b: A plurality of BWPs may be configured, and a plurality of BWPs may be activated. A PDSCH may be transmitted through one BWP.

Option 2: A plurality of BWPs may be configured, and one BWP may be activated. When a clear channel assessment (CCA) for one entire BWP is successful, a gNB may transmit a PDSCH through the one BWP.

Option 3: A plurality of BWPs may be configured, and one BWP may be activated. When a clear channel assessment (CCA) is successful, a gNB may transmit a PDSCH through one entire BWP or part of the BWP.

Success or failure of a CCA in multiples of 20 MHz may be declared.

The disclosure proposes a method for activating/managing/utilizing a bandwidth part (BWP) in configuring a plurality of BWPs and particularly activating a plurality of BWPs according to the foregoing various options and a method for transmitting and receiving data and transmitting uplink control information (e.g., ACK/NACK, SR, CSI, or the like) for the data using the method.

In a future wireless communication system, a plurality of BWPs may be activated/utilized for the same carrier or different carriers when performing transmission and reception based on a BWP. For example, transmission and reception may be performed using a plurality of BWPs allocated in carrier #N, or transmission and reception may be performed using BWP #1 allocated in carrier #N and BWP #2 allocated in carrier #M. Using this method makes it easy to fully utilize frequency fragments even within a single carrier.

In a future wireless communication system, when a plurality of BWPs is activated, a transport block (TB) may be independently scheduled and transmitted or received for each BWP.

Alternatively, transport blocks in the same set may be transmitted for a plurality of BWPs activated for at least the same carrier. In this case, there may be a plurality of BWPs including contiguous physical resource blocks (PRBs), and the BWPs may not be contiguous to each other. In this case, the plurality of BWPs may be considered as a single BWP including noncontiguous PRBs.

Basically, BWPs in the same carrier may use or may be assumed to use the same radio frequency (RF). Therefore, when calculating/considering maximum power reduction (MPR), one carrier may be assumed as in the case of intra-band (contiguous) CA, and a combination of pieces of scheduling information in a plurality of BWPs may be assumed.

The disclosure also proposes a method for activating a plurality of BWPs within a given carrier or cell, and a downlink power control method, a PUCCH transmission method, and a method for configuring and operating a default BWP according to the method.

The idea of the disclosure is not limited to a case where a single cell or carrier is configured and may be applied to a case where a plurality of cells or carriers is configured in an extended manner. Further, the following methods are not limited to a downlink (DL) BWP, an uplink (UL) BWP, or a DL BWP-UL BWP link, and each of the methods may be applied to individual BWP types or a combination thereof.

<Method for Activating a Plurality of BWPs in a Single Carrier or a Single Cell>

Conventionally, the number of BWPs activated in one carrier is limited to one. For example, within one carrier, only one BWP is activated for a downlink and only one BWP is activated for an uplink.

However, in a future wireless communication system, a plurality of BWPs may be activated in one carrier (or cell).

Figure 9:
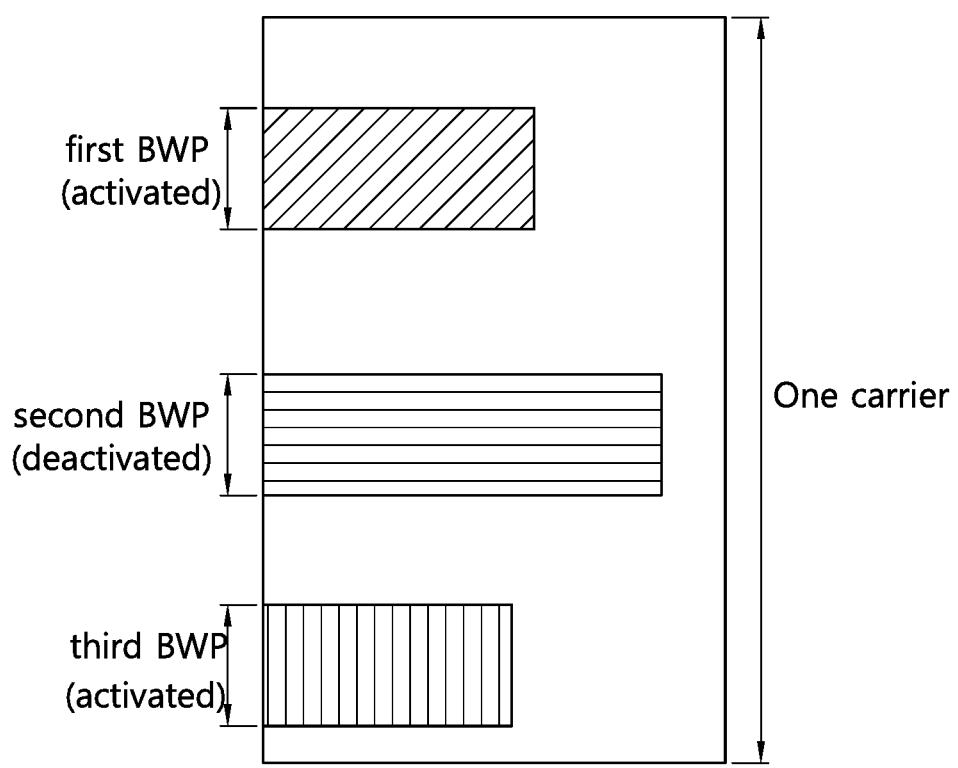
FIG. 9 illustrates a plurality of BWPs activated in one carrier.

FIG. 9 illustrates a plurality of BWPs activated in one carrier.

Referring to FIG. 9, for a UE, a first BWP, a second BWP, and a third BWP may be configured in one carrier. Among the first, second, and third BWPs, the first BWP and the third BWP may be simultaneously activated. The simultaneously activated BWPs may be contiguous to each other or may be spaced by a plurality of PRBs or subcarriers in the frequency domain.

A BWP may be activated through a configuration method by a higher layer (e.g., semi-static BWP adaptation), and/or an indication method through downlink control information (DCI) (dynamic BWP adaptation).

When activating a plurality of BWPs, a method of activating one BWP per carrier may be extended. For example, when activation of one BWP is indicated through DCI, activation of a plurality of BWPs may also be indicated through the DCI, in which a method of indicating the activation of one BWP may be applied in an extended manner Each BWP may be independently activated, and whether two or more BWPs can be activated may be indicated/configured by a higher layer.

Specific examples of a method for activating a plurality of BWPs will be described.

Option 1: When activating a plurality of BWPs in one carrier, the BWPs may be independently activated regardless of the numerology of each BWP.

The following examples may be applied.

1) Example #1: Scheduling DCI may activate one of all configured BWPs regardless of the numerology of BWPs for the scheduling DCI and a scheduled PDSCH.

For example, it is assumed that up to eight BWPs can be configured for a UE, and the UE can support simultaneously activating two BWPs among the set BWPs. Here, activation of a second BWP may be configured/indicated in a first BWP.

According to this method, when the UE goes to a default BWP for reasons, such as expiration of a timer, activation of all activated BWPs may be halted. When the UE comes out of the default BWP, all of the previously activated BWPs may be reactivated using a reserved state of the DCI. For example, there may be a reserved state in a particular field of scheduling DCI in the default BWP, and when the particular field triggers the reserved state by indicating the reserved state, the UE may activate a plurality of BWPs (e.g., reactivate previously activated BWPs).

Alternatively, it is possible to perform BWP activation and additional BWP activation while scheduling one or more BWPs by adding an additional field.

2) Example #2: Scheduling DCI may schedule only a BWP using the same numerology as that for the scheduling DCI. In this case, the number of BWPs (e.g., four) that can be scheduled per numerology may be determined or configured in advance, and switching may be allowed only within the same numerology.

A default BWP may also be set per numerology. A timer may be shared, default BWPs of a plurality of numerologies may simultaneously be activated when the timer expires, and one BWP may be activated at each (numerology-specific) default BWP. This process does not need to proceed simultaneously, and it may be assumed that all the numerologies fall back to the default BWPs only when the timer expires. Alternatively, the timer may be operated differently.

Option 2: One or more BWP groups may be configured in one carrier, and all BWPs in one BWP group may be activated when the BWP group is activated.

Although BWPs use different numerologies, a plurality of BWPs may be associated in order to reduce an RF band. For example, when numerology #0 is activated at frequency f0, it may be advantageous that numerology #1 is activated at f1 adjacent to f0 in view of the overall RF band and power saving. Therefore, when activation is performed by scheduling DCI according to Example #1 or #2 of Option 1, a BWP group may be activated rather than activating one BWP. For example, there may be up to four BWP groups, and each group may be configured to include BWPs that can be simultaneously activated.

A switching command to change a BWP to be activated may be transmitted through scheduling DCI. The scheduling DCI may include a group index and a scheduled BWP index. A BWP group to be activated may be indicated (configured) through the group index, and a BWP scheduled (in the group) may be indicated (configured) through the scheduled BWP index. When scheduling is possible only for the same numerology as in Example #2 (e.g., self-carrier scheduling), assuming that a BWP set for transmitting data is indicated when scheduling is performed in each downlink control BWP and only one BWP in each BWP set belongs to a BWP group, the scheduled BWP may be assumed to the BWP.

For example, up to eight BWPs may be configurable to support two numerologies. Here, a BWP set that can be scheduled in one DL BWP may include four BWPs having the same numerology. Four BWP groups may be configured by designating one BWP group from each of the two numerologies.

A scheduled BWP may be specified depending on a BWP through which scheduling DCI is transmitted, but a plurality of active BWP may be switched at once. This operation may be performed for a DL/UL pair or may be performed independently.

When a waveform used for one UL BWP is configured, it may be assumed that the waveform is also applied to another UL BWP. When the UE is configured with SC-OFDM, it may be assumed that at least one UL BWP is not activated within one carrier.

Option 3: Only one active BWP may exist in one carrier. When a plurality of BWPs needs to be activated, a plurality of carriers may be configured by overlapping. In this option, a BWP set of a different numerology may be processed by a different carrier in a physical layer.

Specifically, when BWPs have the same numerology, the following method may be considered in activating a plurality of BWPs. The following method may also be applied in the same manner when BWPs use different numerologies, or may be applied per numerology in an extended manner.

Alt 1: A BWP set for each cell or carrier may be configured through higher-layer signaling (e.g., an RRC message). A BS may activate one BWP or a plurality of BWPs in the BWP set. A UE initially operating with a single activated BWP (per carrier or per cell) may consider that the BS configures an additional default BWP when configuring an operation of activating a plurality of BWPs. The UE may start by considering an additional BWP as a default BWP. Subsequently, BWP switching may occur through scheduling DCI transmitted in each BWP. Further/alternatively, the UE operating with a single BWP may receive a plurality of pieces of scheduling DCI, and the plurality of pieces of scheduling DCI may indicate different BWPs, thereby indicating/configuring activation of a plurality of BWPs.

Alt 2: A plurality of BWP sets for each cell or carrier may be configured through higher-layer signaling. One BWP set may correspond to a single activated BWP, and another BWP set may correspond to an additional activated BWP.

An additional BWP that is initially used may be configured when an operation of activating a plurality of BWPs is configured in a higher layer. The additional BWP may be subsequently changed through DCI indication and/or higher-layer signaling.

Alt 3: A BWP pair set for each cell or carrier may be configured through higher-layer signaling. The BWP pair may be entirely related to a downlink or an uplink. That is, a virtual BWP including noncontiguous PRBs may be configured through a higher-layer signal.

The BWP pair may include a single BWP or a plurality of BWPs. A BS may select a BWP pair to be used for transmission and reception through DCI indication, MAC signaling, or higher-layer signaling. This method may correspond to an environment in which a single TB or a TB set is transmitted and received in a carrier or cell.

The above methods may be applicable to a paired spectrum, and a BWP (pair) set may be replaced with a BWP (pair) link set in an unpaired spectrum.

In BWP-based transmission and reception, a UE may fail to detect DCI including BWP information used for transmission and reception, in which case the UE may perform an operation of returning to a default BWP after a certain time. Alternatively, when failing to detect scheduling DCI in a specific BWP for a certain time, the UE may also perform an operation of returning to the default BWP in order to save energy for an RF circuit.

When a plurality of active BWPs is configured, different default BWPs may exist for the plurality of active BWPs, respectively. Here, the active BWPs may have different numerologies and/or cyclic prefixes (CPs) and/or processing times. There may be as many expiration timers for returning to each default BWP as the number of BWPs (or the number of default BWPs) that can be simultaneously activated, and whether to return to each default BWP may be determined based on a corresponding timer when performing BWP switching for each BWP (process). A default BWP for an additional BWP may be a third BWP configured in the higher layer or may correspond to returning to a single active BWP operation (per cell or carrier).

Alternatively, there may be one expiration timer per cell or carrier (regardless of whether there is one default BWP or a plurality of default BWPs per cell), and the timer may be increased for each slot in which no scheduling DCI is detected for all active BWPs (in the cell or carrier).

When a plurality of UL BWPs is configured, it is assumed that a PRACH is transmitted only through one BWP (within one carrier), and thus the PRACH may not be configured for all the UL BWPs. When the PRACH is configured, transmission in a different BWP may be dropped (or simultaneous transmissions are possible when power is sufficient), and a timing advance (TA)/power set by the PRACH may be commonly applied to all the UL BWPs. A TA accumulation and a TPC accumulation may be set differently for each UL BWP, and the corresponding commands may be understood as follows: 1) the TA/TPC may be applied only when the BWP is indicated in a UL grant of each scheduling DCI; or 2) there may be a UL BWP set associated with each BWP in which each scheduling DCI can be transmitted. The UL BWP set may refer to a schedulable UL BWP, and the TPC/TA may be applied per UL BWP set.

Alternatively, the TA may be applied to all UL BWP at the same time, in which the TA may be applied according to the smallest subcarrier spacing or the largest subcarrier spacing. For a PUCCH, the TA may be applied to a configured PUCCH BWP. The TA set by the PRACH may be applied to all UL BWPs. This operation may be similar to an operation when both a UL and a sidelink UL are associated with one DL.

<UCI Transmission Method>

When a plurality of DL BWPs is activated, each piece of UCI (particularly, HARQ-ACK feedback) may be independently generated/transmitted. The number of activated DL BWPs and the number of activated UL BWPs or relationship between activated DL BWPs and activated UL BWPs may be independent. That is, the number of DL BWPs may be greater than the number of UL BWPs, or vice versa. A UL BWP for transmitting HARQ-ACK feedback and/or UCI may be configured for each DL BWP. Specifically, a UL BWP for transmitting a PUCCH in which the HARQ-ACK feedback and/or the UCI is transmitted may be configured.

The UL BWP for transmitting the UCI may be configured through higher-layer signaling or may be indicated by scheduling DCI.

A method of indicating the UL BWP using the DCI may use an ACK/NACK resource indicator (ARI) field, in which case PUCCH resources indicated by the ARI may be positioned in different UL BWPs or may be positioned in the same UL BWP. The ARI field may refer to a PUCCH resource indicator field included in a DCI format (e.g., DCI format 1_0 or 1_1) or a field separate from the PUCCH resource indicator field. When pieces of UCI for a plurality of DL BWPs is configured/indicated to be transmitted in the same UL BWP at the same time, the following methods may be considered to transmit the pieces of UCI.

Method 1: Each piece of UCI may be transmitted through each PUCCH. This method may be applied when a UL waveform is limited to cyclic prefix-OFDM (CP-OFDM).

Method 2: The pieces of UCI for the plurality of DL BWPs may be transmitted through a single PUCCH. Here, the order in which the pieces of UCI are arranged may be based on a UCI type (e.g., in an order of HARQ-ACK, SR, and CSI), a BWP index (from UCI for a BWP having the lowest index in the same carrier), and then a carrier index. A UL BWP for transmitting a PUCCH may be configured for each DL BWP. Alternatively, a PUCCH may be transmitted through a UL BWP having the lowest index of BWPs using the same numerology as a PUCCH-numerology (numerology configured through a higher layer) among currently activated UL BWPs. Alternatively, when a group/set in which UL BWPs are activated is configured, a set for transmitting a PUCCH may be configured for each set, or a UL BWP with the lowest index among the activated UL BWPs may be a UL BWP in which a PUCCH is always transmitted. The UL BWP may be a BWP in a carrier/cell in which a PUCCH is configured. Therefore, after the PUCCH carrier/cell is configured, a PUCCH numerology or a UL BWP set may be additionally configured. When using this method, PUCCH transmission may be performed in the same manner as in carrier aggregation between different numerologies. Therefore, when a plurality of activated DL BWPs having different numerologies is mapped to one activated UL BWP, a DL BWP set may be assumed for each numerology, and an index may be assigned to each set and may be assumed as an index in a carrier.

In a case of HARQ-ACK feedback, an HARQ-ACK codebook size may be specified/defined/generated based on the number of configured BWPs (in a cell or a carrier) in order to avoid ambiguity about an HARQ-ACK codebook size due to DCI missing/DTX.

According to another method, the maximum number or the reference number of BWPs that can be simultaneously activated may be configured/indicated through a higher-layer signal, and an HARQ-ACK codebook size may be generated based on the maximum number or the reference number. That is, when a group of BWPs per numerology or a group of BWPs that cannot be simultaneously activated is referred to as a BWP set, there may be as many BWP sets as the number of numerologies simultaneously supported by a UE, and a BWP set index may be assigned to each BWP set. An HARQ-ACK codebook size is assumed to correspond to the number of BWP sets, and ordering may follow 'carrier index-BWP set index-slot index' or 'BWP set index-carrier index-slot index'. Alternatively, when one carrier has a plurality of BWP sets in any order, an HARQ-ACK may be generated for each BWP set in the one carrier.

Method 3: UCI for a single DL BWP may be transmitted through a single PUCCH. Here, a priority rule may be based on an order of a UCI type (e.g., an order of HARQ-ACK, SR, and CSI), a BWP index (from UCI for a BWP having the lowest index in the same carrier), and then a carrier index.

The above various methods may vary in application time and method depending on an ARI configuration. For example, it may be determined whether to simultaneously transmit a plurality of PUCCHs through higher-layer signaling, candidates for an ARI may be determined for each DL activated BWP, for each UL activated BWP, or for each DL activated BWP-UL activated BWP combination, particular UCI may be dropped or piggybacked when PUCCH resources indicated by ARIs in different BWPs are different, and joint coding and transmission may be performed when PUCCH resources indicated by ARIs in different BWPs are the same.

Figure 10:
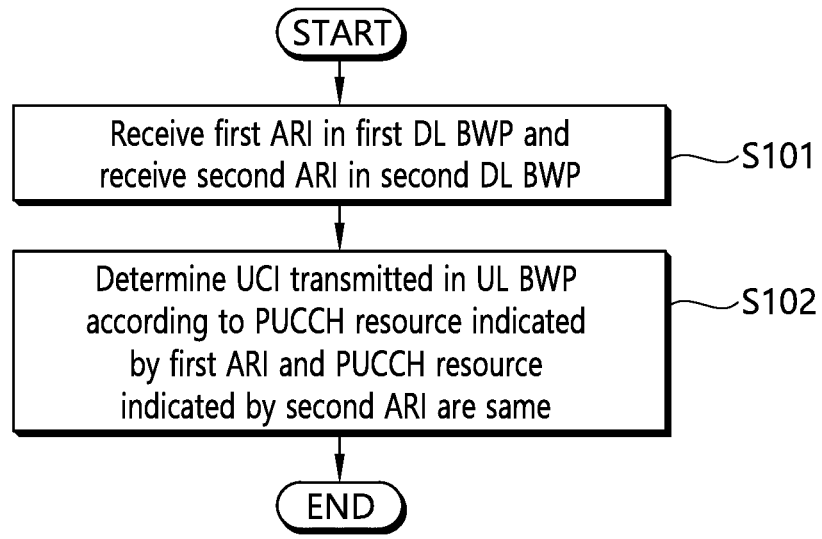
FIG. 10 illustrates a UCI transmission method according to an embodiment of the disclosure.

FIG. 10 illustrates a UCI transmission method according to an embodiment of the disclosure.

Referring to FIG. 10, a UE receives a first ACK/NACK resource indicator (ARI) in a first DL BWP and receives a second ARI in a second DL BWP (S101). Both the first DL BWP and the second DL BWP may be activated BWPs. The first DL BWP and the second DL BWP may use the same numerology or different numerologies. The first DL BWP and the second DL BWP may be BWPs configured in the same carrier.

Each of the first ARI and the second ARI may be included in DCI. The first ARI may indicate a PUCCH resource for transmitting UCI generated for the first DL BWP, for example, an ACK/NACK, an SR, and CSI, and the PUCCH resource may be positioned in a UL BWP. The second ARI may indicate a PUCCH resource for transmitting UCI generated for the second DL BWP, for example, an ACK/NACK, an SR, and CSI, and the PUCCH resource may also be positioned in the UL BWP.

The first ARI and the second ARI may also be referred to as a first PUCCH resource indicator and a second PUCCH resource indicator, respectively.

For example, the UE may determine a set of PUCCH resources according to the number ($N_{UCI\_DL\_BWP\ 1}$) of bits of ACK/NACK information about the first DL BWP and may then determine one PUCCH resource based on the first ARI. Likewise, the UE may determine a set of PUCCH resources according to the number ($N_{UCI\_DL\_BWP\ 2}$) of bits of ACK/NACK information about the second DL BWP and may then determine one PUCCH resource based on the second ARI. Each of the first ARI and the second ARI may include three bits. For example, each PUCCH resource set may include eight resources. For example, the first ARI having a value of n (n is an integer ranging from 0 to 7) may indicate an n+1th PUCCH resource in a set of PUCCH resources. Likewise, the second ARI having a value of n (n is an integer ranging from 0 to 7) may indicate an n+1th PUCCH resource in a set of PUCCH resources.

The UE may determine UCI to be transmitted in the UL BWP according to whether the PUCCH resource indicated by the first ARI is the same as the PUCCH resource indicated by the second ARI (S102). When the first PUCCH resource and the second PUCCH resource are different, the UE may transmit only UCI about one of the first DL BWP and the second DL BWP.

The UE may determine the UCI by sequentially comparing the type of UCI about the first DL BWP with the type of UCI about the second DL BWP, the BWP index of the first DL BWP with the BWP index of the second DL BWP, and the carrier index of the first DL BWP with the carrier index of the second DL BWP.

When the first PUCCH resource and the second PUCCH resource are the same, the UE may jointly code and transmit the UCI about the first DL BWP and the UCI about the second DL BWP together.

Hereinafter, the method of FIG. 10 will be described in detail.

Figure 11:
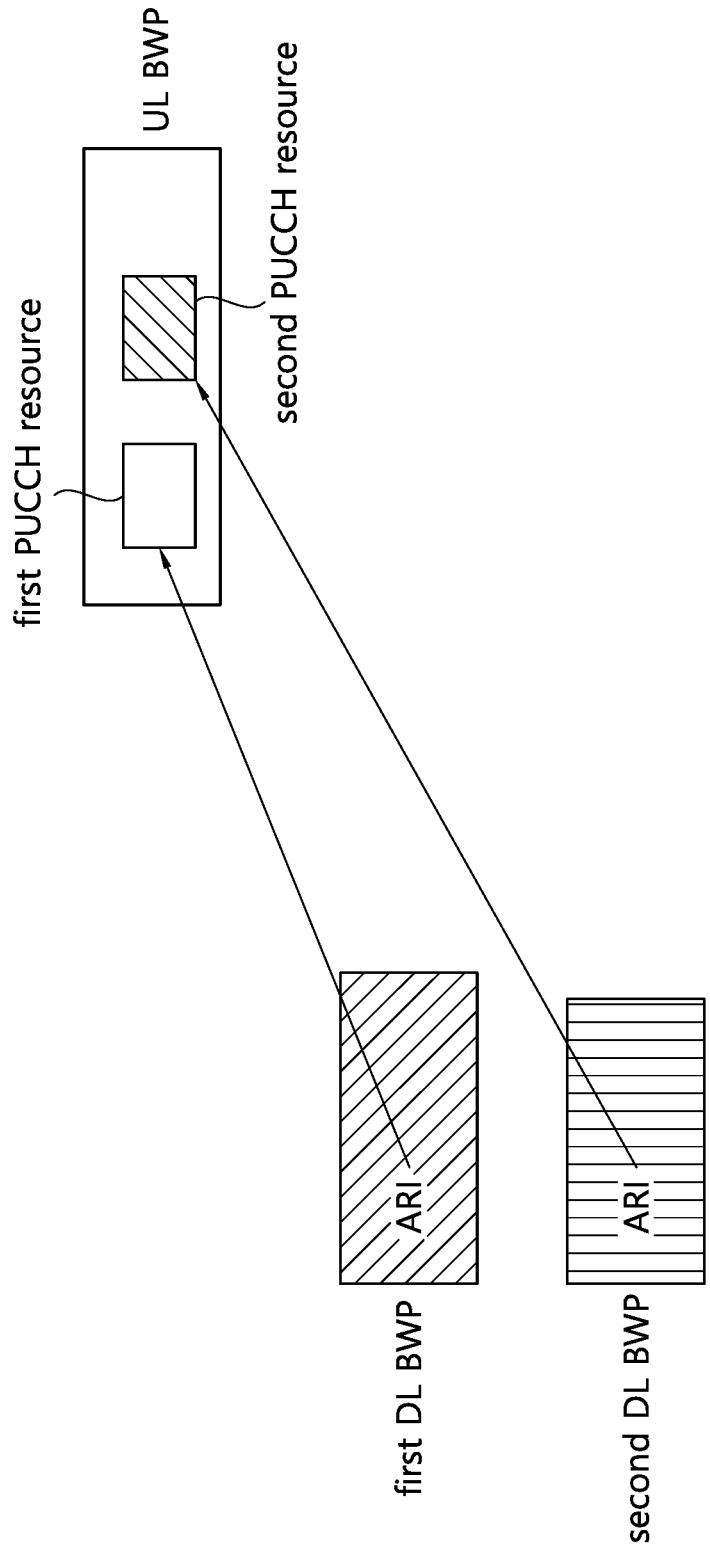
FIG. 11 illustrates a case where PUCCH resources indicated by ARIs in different DL BWPs are different.

FIG. 11 illustrates a case where PUCCH resources indicated by ARIs in different DL BWPs are different, and FIG.

12 illustrates a case where PUCCH resources indicated by ARIs in different DL BWPs are the same.

Referring to FIG. 11, an ARI received in a first DL BWP may indicate a first PUCCH resource of a UL BWP, and an ARI received in a second DL BWP may indicate a second PUCCH resource of the UL BWP. When PUCCH resources indicated by ARIs in different BWPs are different from each other, particular UCI may be dropped or piggybacked. For example, when an ACK/NACK of data received in the first DL BWP is configured to be transmitted on the first PUCCH resource and an ACK/NACK of data received in the second DL BWP is configured to be transmitted on the second PUCCH resource, if the first PUCCH resource and the second PUCCH resource are different, the UE may drop (or piggyback on PUSCH) transmission of the ACK/NACK of the data received in the second DL BWP and may transmit the ACK/NACK of the data received in the first DL BWP through the first PUCCH resource.

Figure 12:
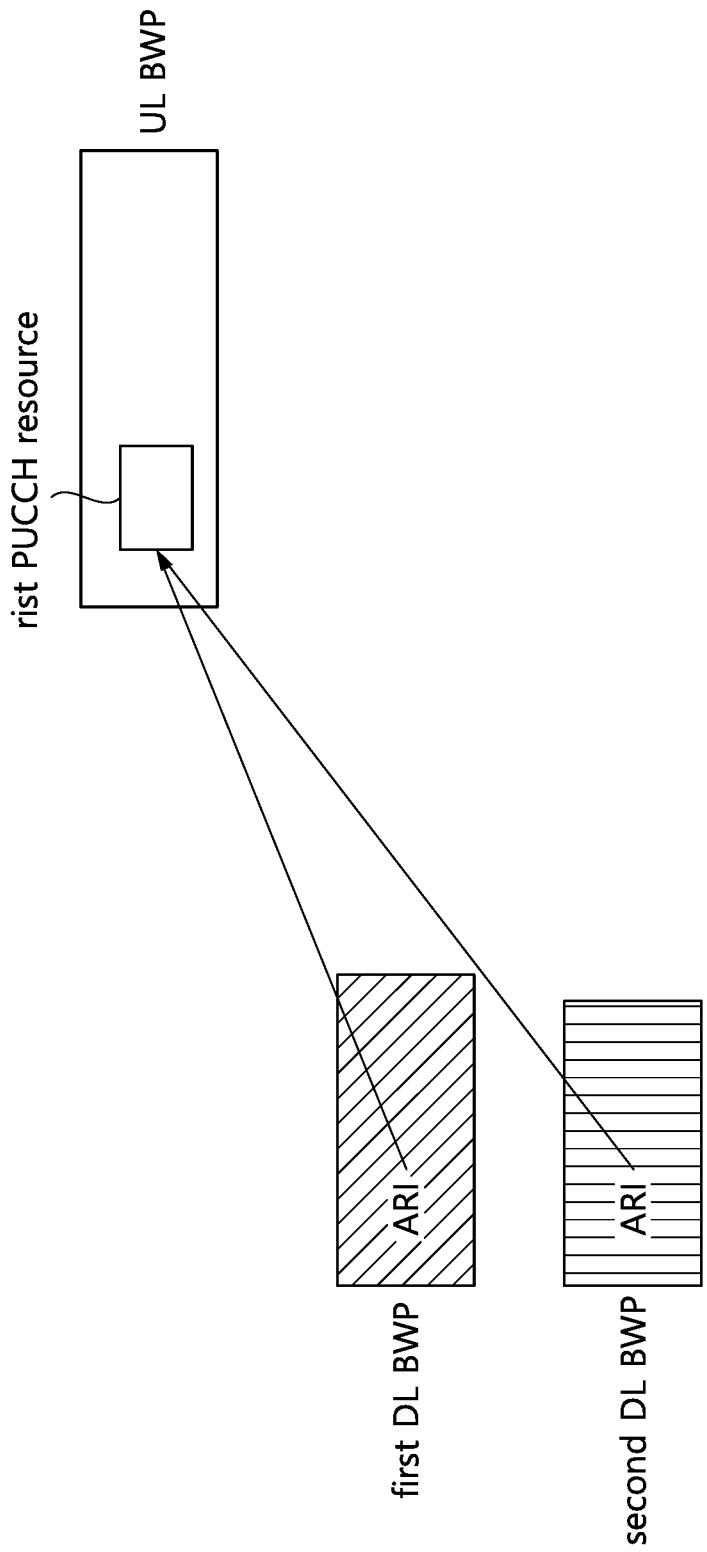
FIG. 12 illustrates a case where PUCCH resources indicated by ARIs in different DL BWPs are the same.

Referring to FIG. 12, an ARI received in a first DL BWP may indicate a first PUCCH resource of a UL BWP, and an ARI received in a second DL BWP may also indicate the first PUCCH resource of the UL BWP. When PUCCH resources indicated by ARIs received in different BWPs are the same, the UE may jointly code and transmit corresponding pieces of DCI. For example, the UE may jointly code an ACK/NACK of data received in the first DL BWP and an ACK/NACK of data received in the second DL BWP and may then transmit the ACK/NACKs together through the first PUCCH resource.

A BWP index may be represented by a numerology in the priority rule or bit ordering. For example, UCI about 15 kHz is processed first according to a rule of UCI type>carrier index between corresponding pieces of UCI (about a 15 kHz numerology), after which UCI about a different numerology may be connected after the UCI about 15 kHz according to the rule of UCI type>carrier index between the corresponding pieces of UCI or may be subjected to a subsequent process according to the priority rule.

Figure 13:
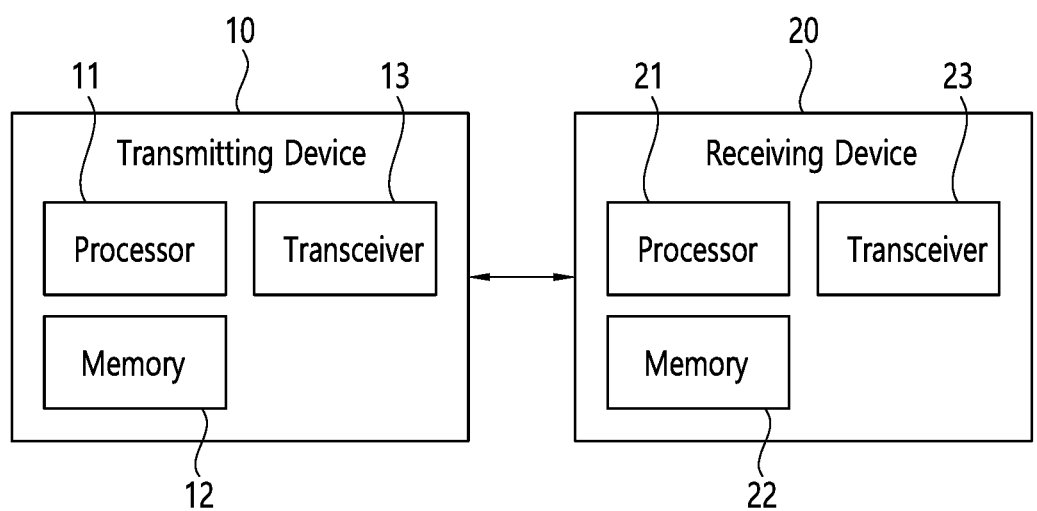
FIG. 13 is a block diagram illustrating components of a transmission device 10 and a reception device 20 to implement the disclosure.

FIG. 13 is a block diagram illustrating components of a transmission device 10 and a reception device 20 to implement the disclosure. Here, each of the transmission device and the reception device may be a BS or a UE.

The transmission device 10 and the reception device 20 may respectively include: transceivers 13 and 23 capable of transmitting or receiving a radio signal carrying information and/or data, a signal, a messages, and the like; memories 12 and 22 to store various kinds of information related to communication in a wireless communication system; and processors 11 and 21 connected to components, such as the memories 12 and 22 and the transceivers 13 and 23, and configured to control the memories 12 and 22 and the transceivers 13 and 23 so that the devices perform at least one of the foregoing embodiments of the disclosure.

The memories 12 and 22 may store a program for processing and controlling the processors 11 and 21 and may temporarily store input/output information. The memories 12 and 22 may be used as buffers.

The processors 11 and 21 generally control the overall operation of various modules in the transmission device or the receiving device. In particular, the processors 11 and 21 may perform various control functions to implement the disclosure. The processors 11 and 21 may also be referred to as controllers, microcontrollers, microprocessors, microcomputers, or the like. The processors 11 and 21 may be configured with hardware, firmware, software, or a combination thereof. When the disclosure is implemented using hardware, application-specific integrated circuits (ASICs), digital signal processors (DSPs), digital signal processing devices (DSPDs), programmable logic devices (PLDs), or field programmable gate arrays (FPGAs) may be included in the processors 11 and 21. When the disclosure is implemented using firmware or software, the firmware or software may be configured to include a module, a procedure, or a function to perform the functions or operations of the disclosure, and the firmware or software configured to perform the disclosure may be provided in the processors 11 and 21 or stored in the memories 12 and 22 to be executed by the processors 11 and 21.

The processor 11 of the transmission device 10 may code and modulate a signal and/or data to be transmitted to the outside and may then transmit the same to the transceiver 13. For example, the processor 11 may generate a codeword through demultiplexing, channel encoding, scrambling, and modulation of a data stream to be transmitted. The codeword may include information equivalent to a transport block which is a data block provided by a MAC layer. One transport block (TB) may be encoded into one codeword. Each codeword may be transmitted to the reception device through one or more layers. The transceiver 13 may include an oscillator for frequency up-conversion. The transceiver 13 may include one or a plurality of transmission antennas.

The signal processing process of the reception device 20 may be configured according to the inverse of the signal processing process of the transmission device 10. Under the control of the processor 21, the transceiver 23 of the reception device 20 may receive a radio signal transmitted by the transmission device 10. The transceiver 23 may include one or a plurality of reception antennas. The transceiver 23 may restore each signal received through the reception antenna into a baseband signal via frequency down-conversion. The transceiver 23 may include an oscillator for frequency down-conversion. The processor 21 may decode and demodulate the radio signal received through the reception antenna, thus restoring data originally transmitted by the transmission device 10.

The transceivers 13 and 23 may include one or a plurality of antennas. According to one embodiment of the disclosure, under the control of the processors 11 and 21, the antenna may transmit a signal processed by the transceivers 13 and 23 to the outside or may receive a radio signal from the outside to transmit the same to the transceivers 13 and 23. The antenna may be referred to as an antenna port. Each antenna may correspond to one physical antenna or may be configured in a combination of two or more physical antenna elements. A signal transmitted from each antenna cannot further be broken down by the reception device 20. A reference signal (RS) transmitted corresponding to the antenna defines an antenna from the perspective of the reception device 20 and enables the reception device 20 to estimate a channel to the antenna regardless of whether the channel is a single radio channel from one physical antenna or a composite channel from a plurality of physical antenna elements including the antenna. That is, the antenna may be defined such that a channel carrying a symbol on the antenna can be derived from the channel carrying another symbol on the same antenna. A transceiver supporting a multi-input multi-output (MIMO) function of transmitting and receiving data using a plurality of antennas may be connected to two or more antennas.

Figure 14:
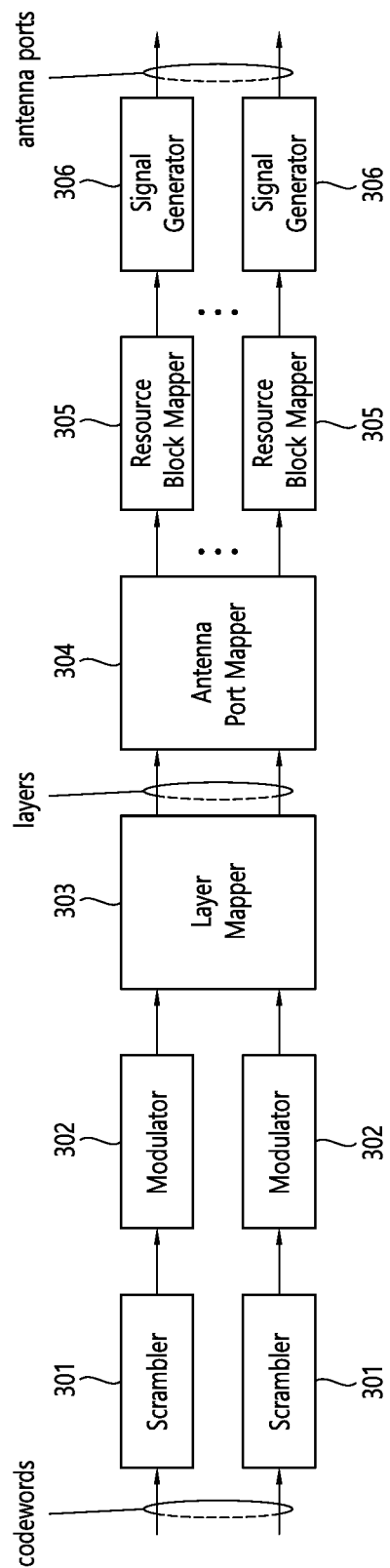
FIG. 14 illustrates an example of the structure of a signal processing module in the transmission device 10.

FIG. 14 illustrates an example of the structure of a signal processing module in the transmission device 10. Here, signal processing may be performed in a processor of a BS/UE, such as the processor 11 of FIG. 13.

Referring to FIG. 14, the transmission device 10 in the UE or the BS may include a scrambler 301, a modulator 302, a layer mapper 303, an antenna port mapper 304, a resource block mapper 305, and a signal generator 306.

The transmission device 10 may transmit one or more codewords. Coded bits in each codeword are scrambled by the scrambler 301 and are transmitted on a physical channel A codeword may also be referred to as a data stream and may be equivalent to a transport block which is a data block provided by a MAC layer.

The scrambled bits are modulated into complex-valued modulation symbols by the modulator 302. The modulator 302 may modulate the scrambled bits according to a modulation scheme into complex-valued modulation symbols representing a position on a signal constellation. The modulation scheme is not restricted, and m-phase shift keying (m-PSK) or m-quadrature amplitude modulation (m-QAM) may be used to modulate the encoded data. The modulator may be referred to as a modulation mapper.

The complex-valued modulation symbols may be mapped to one or more transport layers by the layer mapper 303. Complex-valued modulation symbols on each layer may be mapped by the antenna port mapper 304 for transmission on an antenna port.

The resource block mapper 305 may map the complex-valued modulation symbols for each antenna port to an appropriate resource element in a virtual resource block allocated for transmission. The resource block mapper may map the virtual resource block to a physical resource block according to an appropriate mapping scheme. The resource block mapper 305 may allocate the complex-valued modulation symbols for each antenna port to an appropriate subcarrier and may multiplex the subcarriers according to a user.

The signal generator 306 may modulate the complex-valued modulation symbols for each antenna port, that is, antenna-specific symbols, by a specific modulation scheme, for example, an orthogonal frequency division multiplexing (OFDM) scheme, thereby generating a complex-valued time-domain OFDM symbol signal. The signal generator may perform inverse fast Fourier transform (IFFT) on the antenna-specific symbols, and a cyclic prefix (CP) may be inserted into the time-domain symbols having been subjected to IFFT. The OFDM symbols are transmitted to the reception device through each transmission antenna via digital-to-analog conversion, frequency up-conversion, and the like. The signal generator may include an IFFT module and a CP inserter, a digital-to-analog converter (DAC), a frequency uplink converter, and the like.

Figure 15:
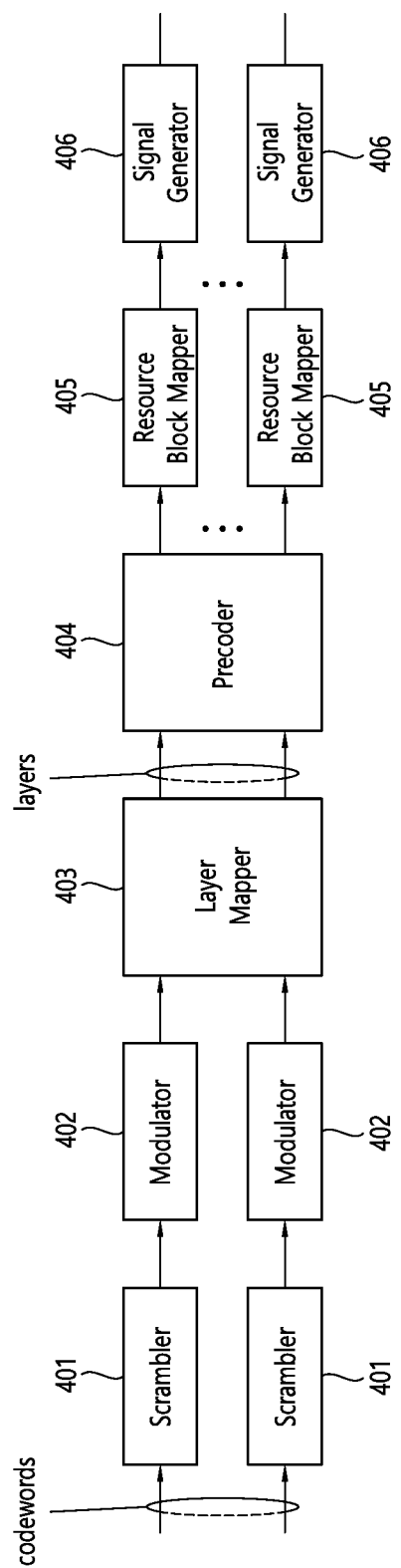
FIG. 15 illustrates another example of the structure of a signal processing module in the transmission device 10.

FIG. 15 illustrates another example of the structure of a signal processing module in the transmission device 10. Here, signal processing may be performed in a processor of a BS/UE, such as the processor 11 of FIG. 13.

Referring to FIG. 15, the transmission device 10 in the UE or the BS may include a scrambler 401, a modulator 402, a layer mapper 403, a precoder 404, a resource block mapper 405, and a signal generator 406.

The transmission device 10 may scramble coded bits in one codeword using the scrambler 401 and may then transmit the same through a physical channel.

The scrambled bits are modulated into complex-valued modulation symbols by the modulator 402. The modulator may modulate the scrambled bits according to a predetermined modulation scheme into complex-valued modulation symbols representing a position on a signal constellation. The modulation scheme is not restricted, and pi/2-binary phase shift keying (pi/2-BPSK), m-phase shift keying (m-PSK), or m-quadrature amplitude modulation (m-QAM) may be used to modulate the encoded data.

The complex-valued modulation symbols may be mapped to one or more transport layers by the layer mapper 403.

Complex-valued modulation symbols on each layer may be precoded by the precoder 404 for transmission on an antenna port. Here, the precoder may perform precoding after performing transform precoding on the complex-valued modulation symbols. Alternatively, the precoder may perform precoding without performing transform precoding. The precoder 404 may process the complex-valued modulation symbols by a MIMO scheme according to a multi-transmission antenna to output antenna-specific symbols and may distribute the antenna-specific symbols to the corresponding resource block mapper 405. Output z from the precoder 404 may be obtained by multiplying output y from the layer mapper 403 by an N×M precoding matrix W, where N is the number of antenna ports, and M is the number of layers.

The resource block mapper 405 may map the complex-valued modulation symbols for each antenna port to an appropriate resource element in a virtual resource block allocated for transmission.

The resource block mapper 405 may allocate the complex-valued modulation symbols to an appropriate subcarrier and may multiplex the subcarriers according to a user.

The signal generator 406 may modulate the complex-valued modulation symbols by a specific modulation scheme, for example, an OFDM scheme, thereby generating a complex-valued time-domain OFDM symbol signal. The signal generator 406 may perform inverse fast Fourier transform (IFFT) on the antenna-specific symbols, and a cyclic prefix (CP) may be inserted into the time-domain symbols having been subjected to IFFT. The OFDM symbols are transmitted to the reception device through each transmission antenna via digital-to-analog conversion, frequency up-conversion, and the like. The signal generator 406 may include an IFFT module and a CP inserter, a digital-to-analog converter (DAC), a frequency uplink converter, and the like.

The signal processing process of the reception device 20 may be configured according to the inverse of the signal processing process of the transmission device. Specifically, the processor 21 of the reception device 20 decodes and demodulates a radio signal received through an antenna port(s) of the transceiver 23. The reception device 20 may include a plurality of multi-reception antennas, and each signal received through the reception antennas is restored to a baseband signal, and is then restored to a data stream, originally transmitted by the transmission device 10, via multiplexing and MIMO demodulation. The reception device 20 may include a signal reconstructor to restore a received signal to a baseband signal, a multiplexer to combine and multiplex received signals, and a channel demodulator to demodulate a multiplexed signal stream into a codeword. The signal reconstructor, the multiplexer, and the channel demodulator may be configured as one integrated module to perform their functions or as separate modules. Specifically, the signal reconstructor may include an analog-to-digital converter (ADC) to convert an analog signal into a digital signal, a CP remover to remove a CP from a digital signal, a fast Fourier transform (FFT) module to apply FFT to a CP-removed signal to output a frequency-domain symbol, and a resource element demapper/equalizer to restore a frequency-domain symbol into an antenna-specific symbol. The antenna-specific symbol is restored to a transport layer by the multiplexer, and the transport layer is restored by a channel demodulator to a codeword, transmitted by the transmission device.

Figure 16:
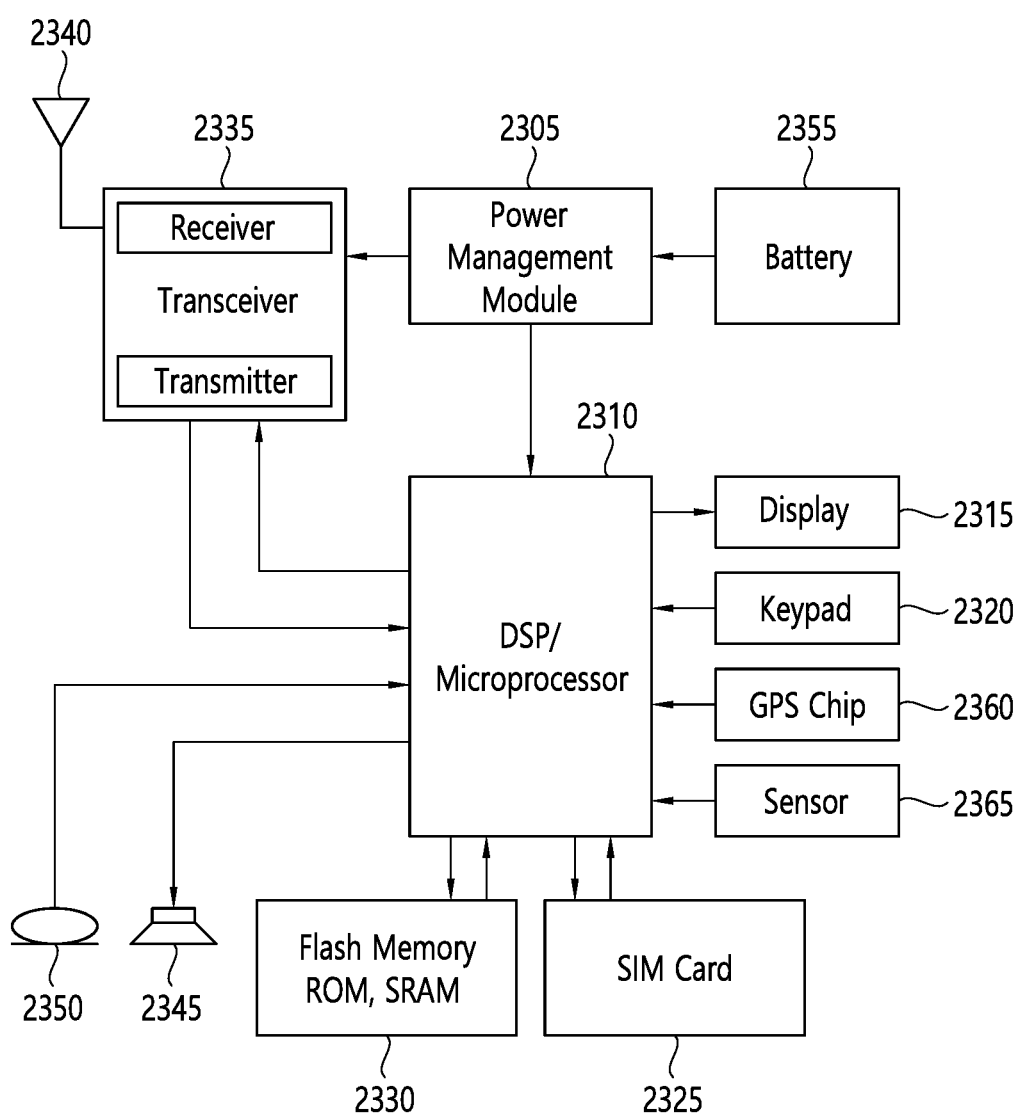
FIG. 16 illustrates an example of a wireless communication device according to an embodiment of the disclosure.

FIG. 16 illustrates an example of a wireless communication device according to an embodiment of the disclosure.

According to FIG. 16, the wireless communication device, for example, a UE, may include and at least one of a processor 2310, such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. There may be a plurality of antennas and a plurality of processors.

The processor 2310 may implement the functions, procedures, and methods described herein. The processor 2310 of FIG. 16 may be the processors 11 and 21 of FIG. 13.

The memory 2330 is connected to the processor 2310 and stores information related to the operation of the processor. The memory may be disposed inside or outside the processor and may be connected to the processor through various technologies, such as a wired connection or a wireless connection. The memory 2330 of FIG. 16 may be the memories 12 and 22 of FIG. 13.

A user may input various kinds of information, such as a telephone number, using various techniques, for example, by pressing a button of the keypad 2320 or by activating a sound using the microphone 2350. The processor 2310 may perform an appropriate function, such as receiving and processing user information and making a phone call with an input telephone number. In some scenarios, data may be retrieved from the SIM card 2325 or the memory 2330 to perform an appropriate function. In some scenarios, the processor 2310 may display various kinds of information and data on the display 2315 for the convenience of the user.

The transceiver 2335 is connected to the processor 2310 and transmits and/or receives a radio signal, such as a radio frequency (RF) signal. The processor may control the transceiver to initiate communication or to transmit a radio signal including various kinds of information or data, such as voice communication data. The transceiver includes a transmitter and a receiver to transmit and receive radio signals. The antenna 2340 may facilitate the transmission and reception of radio signals. In some embodiments, upon receiving a radio signal, the transceiver may forward and convert the signal with a baseband frequency for processing by the processor. The processed signal may be processed by various techniques, such as being converted into audible or readable information to be output through the speaker 2345. The transceiver of FIG. 16 may be the transceivers 13 and 23 of FIG. 13.

Although not shown in FIG. 16, various components, such as a camera and a universal serial bus (USB) port, may be additionally included in the UE. For example, the camera may be connected to the processor 2310.

FIG. 16 shows only one example of the UE, and various examples may be provided without being limited thereto. The UE should not necessarily include all the components illustrated in FIG. 16. That is, some components, for example, the keypad 2320, the GPS chip 2360, the sensor 2365, and the SIM card 2325, may not be essential components and may thus not be included in the UE.

What is claimed is:

1. A method for transmitting uplink control information (UCI), the method comprising:

receiving a first ACK/NACK resource indicator (ARI) in a first downlink bandwidth part (BWP);
receiving a second ARI in a second downlink BWP;
determining UCI transmitted in an uplink BWP according to whether a first physical uplink control channel (PUCCH) resource indicated by the first ARI is the same as a second PUCCH resource indicated by the second ARI; and
transmitting the determined UCI through the uplink BWP.

2. The method of claim 1, wherein the first downlink BWP and the second downlink BWP are activated BWPs.

3. The method of claim 1, wherein, when the first PUCCH resource and the second PUCCH resource are different, only UCI about one of the first downlink BWP and the second downlink BWP is transmitted.

4. The method of claim 3, wherein the UCI is determined by sequentially comparing a type of UCI about the first downlink BWP with a type of UCI about the second downlink BWP, a BWP index of the first downlink BWP with a BWP index of the second downlink BWP, and a carrier index of the first downlink BWP with a carrier index of the second downlink BWP.

5. The method of claim 1, wherein, when the first PUCCH resource and the second PUCCH resource are the same, UCI about the first downlink BWP and UCI about the second downlink BWP are jointly coded and transmitted together.

6. The method of claim 1, wherein the first downlink BWP and the second downlink BWP use the same numerology.

7. The method of claim 1, wherein the first downlink BWP and the second downlink BWP are BWPs configured in the same carrier.

8. The method of claim 1, wherein each of the first ARI and the second ARI is received through downlink control information (DCI).

9. A device comprising:
a transceiver to transmit and receive a radio signal; and
a processor coupled with the transceiver to operate,
wherein the processor receives a first ACK/NACK resource indicator (ARI) in a first downlink bandwidth part (BWP), receives a second ARI in a second downlink BWP, determines UCI transmitted in an uplink BWP according to whether a first physical uplink control channel (PUCCH) resource indicated by the first ARI is the same as a second PUCCH resource indicated by the second ARI, and transmits the determined UCI through the uplink BWP.

10. The device of claim 9, wherein the first downlink BWP and the second downlink BWP are activated BWPs.

11. The device of claim 9, wherein, when the first PUCCH resource and the second PUCCH resource are different, only UCI about one of the first downlink BWP and the second downlink BWP is transmitted.

12. The device of claim 11, wherein the UCI is determined by sequentially comparing a type of UCI about the first downlink BWP with a type of UCI about the second downlink BWP, a BWP index of the first downlink BWP with a BWP index of the second downlink BWP, and a carrier index of the first downlink BWP with a carrier index of the second downlink BWP.

13. The device of claim 9, wherein, when the first PUCCH resource and the second PUCCH resource are the same, UCI about the first downlink BWP and UCI about the second downlink BWP are jointly coded and transmitted together.

14. The device of claim 9, wherein the first downlink BWP and the second downlink BWP use the same numerology.

15. The device of claim 9, wherein the first downlink BWP and the second downlink BWP are BWPs configured in the same carrier.

16. The device of claim 9, wherein each of the first ARI and the second ARI is received through downlink control information (DCI).

\* \* \* \* \*